(12) United States Patent
Hemphill

(10) Patent No.: US 9,500,260 B2
(45) Date of Patent: Nov. 22, 2016

(54) HARMONIC BALANCER WITH REDUCED AXIAL LENGTH

(71) Applicant: Schaeffler Technologies AG & Co. KG, Herzogenaurach (DE)

(72) Inventor: Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/696,746

(22) Filed: Apr. 27, 2015

(65) Prior Publication Data

US 2015/0316122 A1 Nov. 5, 2015

Related U.S. Application Data

(60) Provisional application No. 61/986,448, filed on Apr. 30, 2014.

(51) Int. Cl.
*F16F 15/126* (2006.01)
*F16F 15/12* (2006.01)

(52) U.S. Cl.
CPC ............ *F16F 15/126* (2013.01); *F16F 15/12* (2013.01); *Y10T 74/2131* (2015.01)

(58) Field of Classification Search
CPC ................... F16F 15/124; F16F 15/126; F16F 15/12; F16H 2055/366; Y10T 74/2131; Y10T 74/213; Y10T 74/2121
See application file for complete search history.

(56) References Cited

U.S. PATENT DOCUMENTS

| 1,646,897 | A | * | 10/1927 | Burns | F16F 15/126 415/119 |
| 5,405,296 | A | * | 4/1995 | Cerny | F16F 15/126 464/89 |
| 5,445,049 | A | * | 8/1995 | Ullrich | F16F 15/126 267/141.3 |
| 7,905,159 | B2 | * | 3/2011 | Manzoor | F16F 15/124 74/574.4 |

FOREIGN PATENT DOCUMENTS

| DE | 19506454 C1 | * | 5/1996 | ............... F16D 3/76 |
| EP | 2392834 | | 12/2011 | |

* cited by examiner

*Primary Examiner* — Thomas Diaz
(74) *Attorney, Agent, or Firm* — Volpe and Koenig, P.C.

(57) ABSTRACT

A harmonic balancer assembly is provided including a drive plate adapted to be attached to a crankshaft or other drive shaft. A first circumferentially extending elastomeric ring is connected to an axial face of the drive plate. An inertia ring is provided which also includes an axial face that is connected to the first elastomeric ring. A drive element can be connected to or engaged with the inertia ring in order to transmit torque from the drive plate to a further element in a drive train. The inertia ring can be connected to a pulley, a torque converter, or other transmission element in order to, for example, transfer torque from a crankshaft to a further transmission component or to transfer torque to a separate power take off.

17 Claims, 1 Drawing Sheet

HARMONIC BALANCER WITH REDUCED AXIAL LENGTH

INCORPORATION BY REFERENCE

The following documents are incorporated herein by reference as if fully set forth: U.S. Provisional Patent Application No. 61/986,448, filed Apr. 30, 2014.

FIELD OF THE INVENTION

The present invention is related to the field of harmonic balancers. More particularly, the invention is directed to a reduced axial length harmonic balancer that can be used in connection with an internal combustion engine to transfer the power to the transmission.

BACKGROUND

In order to increase fuel economy, automotive design has recently concentrated on reducing weight as well as reducing the size of various components, including the power drive train. One improvement has resulted in the auxiliary drives being removed from the front of an engine and being driven via a transmission accessory drive. This has allowed a reduction in the overall length of the power train as these auxiliary drives are now driven via a transmission take-off.

It would be desirable to provide a further reduction in the length of the power train. It would also be desirable to provide a reduced axial length harmonic balancer that can be used in connection with various drive shafts where torque undulations from the input side can be absorbed or otherwise addressed in order to reduce torque fluctuations on the output side.

SUMMARY

In one aspect, a harmonic balancer assembly is provided. The assembly includes a drive plate adapted to be attached to a crankshaft or other drive shaft. A first circumferentially extending elastomeric ring is connected to an axial face of the drive plate. An inertia ring is provided which also includes an axial face that is connected to the first elastomeric ring. A drive element can be connected to or engaged with the inertia ring in order to transmit torque from the drive plate to a further element in a drive train. For example, the inertia ring can be connected to a pulley, a torque converter, or other transmission element in order to, for example, transfer torque from a crankshaft to a further transmission component or to transfer torque to a separate power take off via the pulley.

Preferably, holes, depressions, or voids are located in at least one of the drive plate or the inertia ring in a connection area to the elastomeric ring. This allows a strong mechanical connection between the elastomeric ring and the drive plate.

Preferably, the elastomeric ring is at least one of vulcanized, bonded, or adhered to the drive plate and the inertia ring.

In a further improvement of the invention, the drive plate includes locating tabs that contact an inner radial surface of the first elastomeric ring. Further, the drive plate can include centering tabs for the inertia ring. The drive plate is preferably a punched or stamped sheet metal part, and the locating tabs and centering tabs can be punched out during formation of the drive plate.

In another aspect of the invention, depending upon the torque to be transferred, a support plate is connected to the drive plate. A second circumferentially extending elastomeric ring is connected to an opposite axial face of the inertia ring from the first elastomeric ring. The second elastomeric ring is also connected to an axial face of the support ring on an opposite side from the inertia ring.

In a preferred arrangement, the first and second elastomeric rings are connected to the drive plate, the inertia ring, and the support plate by at least one of a vulcanized, bonded, or adhered connection.

Preferably, the support plate can also include locating tabs that radially contact an inside of the second elastomeric ring. This support plate may also include centering tabs for the inertia ring, depending upon the particular configuration. The support plate is preferably a stamped sheet metal part and the locating tabs and centering tabs may be formed during the stamping process.

In another aspect, a harmonic balancer for a rotary drive is provided including a drive plate adapted to be attached to a drive shaft, as well as a first circumferentially extending elastomeric ring connected to an axial face of the drive plate. An inertia ring is provided having an axial face connected to the first elastomeric ring, and a driven element is connected to the inertia ring. Here, a reduced axial length harmonic balancer is provided that can be used in connected with various types of drives in order to smooth out or absorb pulses or non-uniformity in the angular velocity in the drive so that these pulses are not transmitted through to the driven element.

Here, the elastomeric ring is preferably at least one of vulcanized, bonded, or otherwise adhered to the drive plate and the inertia ring.

The driven element can be, for example, a pulley, a torque converter, a gear ring, or other drive element.

BRIEF DESCRIPTION OF THE DRAWINGS

The foregoing Summary as well as the following Detailed Description will be best understood when read in conjunction with the appended drawings which show a preferred embodiment of the invention. In the drawings.

DETAILED DESCRIPTION OF THE PREFERRED EMBODIMENTS

Figure 1:
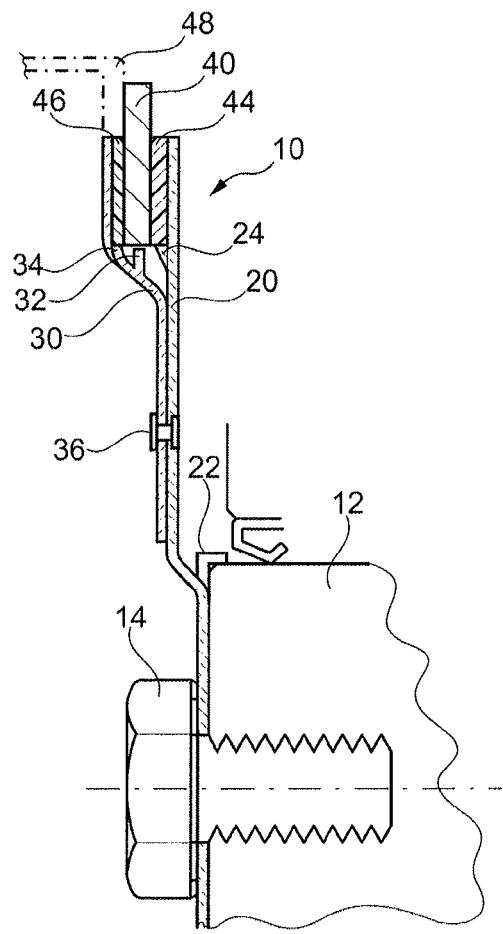
FIG. 1 is a cross-sectional view through a first embodiment of a harmonic balance according to the present invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. These terms and terms of similar import are for ease of description when referring to the drawings and should not be considered limiting. "Axially" refers to a direction along the axis of a shaft or similar object. A reference to a list of items that are cited as "at least one of a, b, or c" (where a, b, and c represent the items being listed) means any single one of the items a, b, or c, or combinations thereof.

For elements of the invention that are identical or have identical actions, identical reference symbols are used. The illustrated embodiments represent merely examples for how the device according to the invention could be equipped. They do not represent a conclusive limitation of the invention.

Referring now to FIG. 1, a harmonic balancer assembly 10 is shown according to a first preferred embodiment of the invention. The harmonic balancer 10 includes a drive plate 20 that is adapted to be attached to a crankshaft 12 via a mounting bolt 14. A first circumferentially extending elastic ring 44 is connected to an axial face of the drive plate 20. An inertia ring 40 having a first axial face is connected to the first elastomeric ring 44 by the first axial face. A support plate 30 is connected to the drive plate 20, preferably via fasteners, such as rivets 36. A second circumferentially extending elastomeric ring 46 is connected to a second axial face of the inertia ring 40, opposite from the first axial face of the inertia ring 40 and from the first elastomeric ring 44. The second elastomeric ring 46 is connected to an axial face of the support plate 30 on an opposite side from the inertia ring 40.

Preferably, the first and second elastomeric rings 44, 46 are made from rubber, synthetic rubber, or another suitable elastomeric material. The elastomeric rings 44, 46 are at least one of vulcanized, bonded, or otherwise adhered to the drive plate 20 as well as the support plate 30 and the inertia ring 40.

The drive plate 20 preferably includes locating tabs 24 that contact an inner radial surface of the first elastomeric ring 44. A plurality of the locating tabs 24 are preferably provided, spaced apart circumferentially on the drive plate 20. For example, there can be eight equally spaced locating tabs 24. The drive plate 20 preferably also includes centering tabs 22 that engage an end surface of the crankshaft 12 for centering the harmonic balancer 10 on the crankshaft. A plurality of the centering tabs 22 are preferably also provided, and are spaced apart circumferentially.

The support plate 30 can also include locating tabs 34 that radially contact an inside of the second elastomeric ring 46. The support plate 30 may also include centering tabs 32 for the inertia ring 40. Preferably there are a plurality of the locating tabs 34 that are spaced apart circumferentially, and there are also a plurality of the centering tabs 32 spaced apart circumferentially on the support plate 30.

Preferably, the drive plate 20 is a punched or stamped sheet metal part. The support plate 30 is preferably also a punched or stamped sheet metal part. The centering tabs 32 as well as the locating tabs 24, 34 are preferably formed during the punching or stamping process of the drive plate 20 as well as the support plate 30.

Using this arrangement, the inertia ring 40 is sandwiched between the two elastomeric rings 44, 46. The drive plate 20 and the support plate 30 are preferably riveted together via rivets 36 providing a pre-load on the elastomeric rings 44, 46 and trapping the inertia ring. The locating tabs 24, 34 and the centering tabs 32 for the inertia ring provide for easier assembly of the harmonic balancer 10, and the centering tabs 22 for the crankshaft allow for easier installation. Based on this construction using the elastomeric rings 44, 46, the overall harmonic balancer 10 has a shorter axial length than the prior known harmonic balancers. The inertia ring 40 can be connected to a driven element illustrated in broken lines as 48, which can be a pulley, torque converter or other transmission element.

Figure 2:
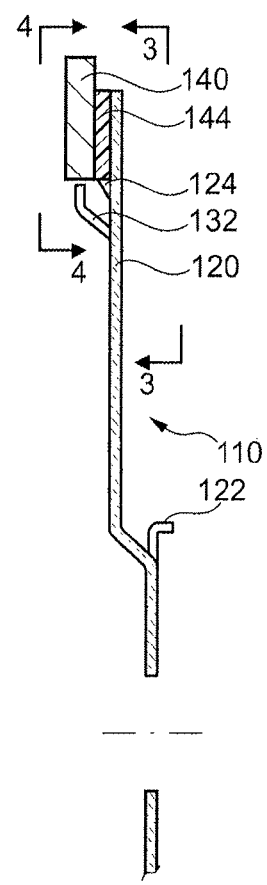
FIG. 2 is a cross-sectional view of a harmonic balancer according to a second embodiment of the invention.
Figure 3:
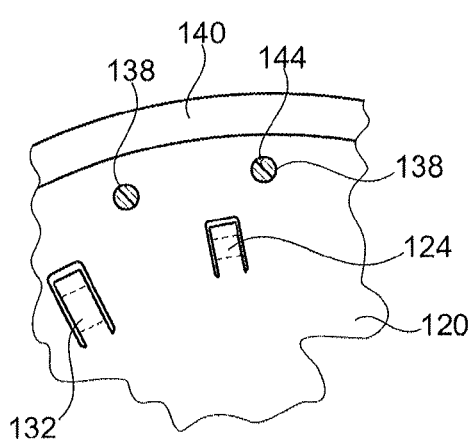
FIG. 3 is a view taken along lines 3-3 in FIG. 2 showing a portion of an axial face of the support plate.
Figure 4:
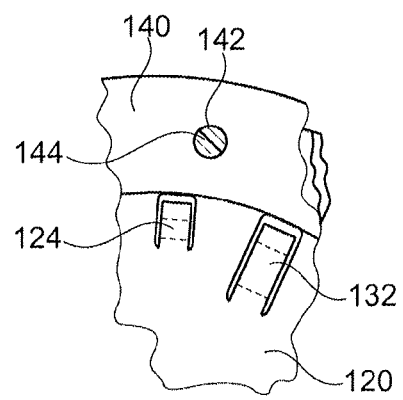
FIG. 4 is an opposite axial view to FIG. 3 taken along lines 4-4 in FIG. 2 showing a portion of an opposite axial face of the drive plate.

Referring to FIGS. 2-4, a second embodiment of a harmonic balancer 110 is shown. The second embodiment of the harmonic balancer 110 is a simplified embodiment in which the harmonic balancer 110 includes the drive plate 120 with a circumferentially extending elastomeric ring 144 connected to an axial face of the drive plate 120. An inertia ring 140 is provided having an axial face connected to the elastomeric ring 144. A driven element can then be connected to the inertia ring 140. In this embodiment, the elastomeric ring 144 is connected to both the support plate 120 as well as the inertia ring 140 by at least one of vulcanizing, bonding, or adhering.

Preferably, the drive plate 120 includes centering tabs 122, preferably circumferentially spaced apart on the drive plate 120, for connecting to a drive shaft, such as the crankshaft 12 shown in FIG. 1. Additionally, the drive plate 120 includes centering tabs 132 for the inertia ring 140 as well as locating tabs 124 for the elastomeric ring 144. These tabs are preferably formed in the drive plate 120 during the punching or stamping process used to form the drive plate 120.

As shown in detail in FIGS. 3 and 4, preferably holes 138 are punched in the drive plate 120 in the area of the connection to the elastomeric ring 144. Additionally, holes 142 are preferably also punched into the inertia ring in a connection area to the elastomeric ring 144. These holes can be in the form of through openings, depressions, or other voids and are used to ensure a strong mechanical connection between the elastomeric ring and the drive plate 120 and the inertia ring 140. This is particularly preferred when the elastomeric ring is a vulcanized rubber ring and vulcanized material flows into and/or through the holes 138, 142 to provide a secure connection.

The holes in the drive plate 120 and the inertia ring 140 can be used in connection with the first embodiment as well to provide a firm connection between the elastomeric rings 44, 46 and the drive plate 20, the support plate 30 and the inertia ring 40.

In the first preferred embodiment, the elastomeric rings 44, 46 may be made of suitable natural or synthetic elastomers with the desired properties for the particular application, and the thickness will vary depending upon the torque to be transferred and other factors. A thickness in the range of 2-3 mm is believed to be suitable; however, other thicknesses can be used. This provides the harmonic balancer function with a reduced overall thickness as it avoids the use of coil springs and relies on the elastomeric rings connected to the axial faces of both the drive plate 20, the support plate 30 as well as the inertia ring 40.

In the second preferred embodiment, the elastomeric ring 144 is preferably also made from suitable natural or synthetic elastomers. The thickness of the elastomeric ring 144 can also vary depending upon the torque to be transferred and other factors. A thickness in the range of 2-4 mm is believed to be suitable; however, other thicknesses can be used. This arrangement also provides for a reduced axial thickness.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A harmonic balancer assembly, comprising:
a drive plate adapted to be attached to a crankshaft;
a first circumferentially extending elastomeric ring connected to an axial face of the drive plate;
an inertia ring having an axial face connected to the first elastomeric ring;
a support plate connected to the drive plate; and
a second circumferentially extending elastomeric ring connected to an opposite axial face of the inertia ring from the first elastomeric ring, and the second elastomeric ring is connected to an axial face of the support plate on an opposite side from the inertia ring,
the drive plate, the first elastomeric ring, and the inertia ring axially overlap in a connection area, and
the support plate includes centering tabs for the inertia ring.

2. The harmonic balancer assembly of claim 1, further comprising holes, depressions, or voids located in at least one of the drive plate or the inertia ring in a connection area to the first elastomeric ring.

3. The harmonic balancer assembly of claim 1, wherein the first elastomeric ring is at least one of vulcanized, bonded, or adhered to the drive plate and the inertia ring.

4. The harmonic balancer of claim 1, wherein the drive plate includes locating tabs that contact an inner radial surface of the first elastomeric ring.

5. The harmonic balancer of claim 1, wherein the drive plate includes centering tabs for the inertia ring.

6. The harmonic balancer of claim 1, wherein the drive plate is a punched or stamped sheet metal part.

7. The harmonic balancer of claim 1, wherein the first and second elastomeric rings are connected to the drive plate, the inertia ring, and the support plate by at least one of a vulcanized, bonded, or adhered connection.

8. The harmonic balancer of claim 1, wherein the support plate is a punched or stamped sheet metal part.

9. A harmonic balancer for a rotary drive, comprising:
a drive plate adapted to be attached to a driveshaft;
a first circumferentially extending elastomeric ring connected to an axial face of the drive plate;
an inertia ring having an axial face connected to the first elastomeric ring,
a support plate connected to the drive plate;
a second circumferentially extending elastomeric ring connected to an opposite axial face of the inertia ring from the first elastomeric ring, and the second elastomeric ring is connected to an axial face of the support plate on an opposite side from the inertia ring;
the drive plate, the first elastomeric ring, and the inertia ring axially overlap in a connection area, and the support plate includes centering tabs for the inertia ring; and
a driven element connected to the inertia ring.

10. The harmonic balancer of claim 9, wherein the first elastomeric ring is at least one of vulcanized, bonded, or adhered to the drive plate and the inertia ring.

11. A harmonic balancer assembly, comprising:
a drive plate adapted to be attached to a crankshaft;
a first circumferentially extending elastomeric ring connected to an axial face of the drive plate;
an inertia ring having an axial face connected to the first elastomeric ring;
a support plate connected to the drive plate; and
a second circumferentially extending elastomeric ring connected to an opposite axial face of the inertia ring from the first elastomeric ring, and the second elastomeric ring is connected to an axial face of the support plate on an opposite side from the inertia ring,
the drive plate, the first elastomeric ring, and the inertia ring axially overlap in a connection area, and
the support plate includes locating tabs that radially contact an inside of the second elastomeric ring.

12. The harmonic balancer assembly of claim 11, further comprising holes, depressions, or voids located in at least one of the drive plate or the inertia ring in a connection area to the first elastomeric ring.

13. The harmonic balancer assembly of claim 11, wherein the first elastomeric ring is at least one of vulcanized, bonded, or adhered to the drive plate and the inertia ring.

14. The harmonic balancer of claim 11, wherein the drive plate includes locating tabs that contact an inner radial surface of the first elastomeric ring.

15. The harmonic balancer of claim 11, wherein the drive plate includes centering tabs for the inertia ring.

16. The harmonic balancer of claim 11, wherein the drive plate is a punched or stamped sheet metal part.

17. The harmonic balancer of claim 11, wherein the first and second elastomeric rings are connected to the drive plate, the inertia ring, and the support plate by at least one of a vulcanized, bonded, or adhered connection.

* * * * *